United States Patent [19]

Koenig

[11] 3,916,934

[45] Nov. 4, 1975

[54] TRANSMISSION CONTROL WITH ESSENTIALLY RATELESS REGULATOR VALVE

[75] Inventor: Richard J. Koenig, Carmel, Ind.

[73] Assignee: General Motors Corporation, Detroit, Mich.

[22] Filed: Feb. 11, 1974

[21] Appl. No.: 441,372

[52] U.S. Cl................ 137/115; 74/752 C; 184/6.12
[51] Int. Cl. ............................................ G05d 16/10
[58] Field of Search............................ 137/115, 118

[56] References Cited
UNITED STATES PATENTS

| | | | |
|---|---|---|---|
| 1,917,316 | 7/1933 | Naab.................................. | 137/118 |
| 3,703,186 | 11/1972 | Brewer.............................. | 137/118 |

*Primary Examiner*—Robert G. Nilson
*Attorney, Agent, or Firm*—A. M. Heiter

[57] ABSTRACT

The power shift transmission has a pump supplying main line pressure to the shift controls. A regulating valve regulates main line pressure at an essentially constant value and first connects main line overage to a lubrication line and then when the main line and lubricating line requirements are supplied, connects overage to exhaust. The regulator valve has a bore with a main line port, a first overage land, a lubrication port, a second overage land and an exhaust port normally spaced in an opening direction. A valve element, having a land with an end and a central passage from the land end to a slot port in the land is positioned in the closed end of a bore forming a chamber supplied with main line pressure by the main line port to bias the valve element in an opening direction against a spring. During low main line overage flow, the valve element oscillates in a position controlling low overage flow between the first overage land and the valve element land end to the lubrication port to regulate main line pressure and the valve element land port is centrally blocked by the second overage land. During high overage flow after the main line and lubrication flow requirements are met, the valve element land end opens the lubrication port for full flow and the valve element oscillates in a position controlling high overage flow between the second overage land and the valve element land port to the exhaust port to regulate main line pressure so that full valve element movement between low and high overage flow regulation is less than half the axial length of the second overage land for essentially constant pressure regulation. The pressure acts on a differential area on the valve element to limit the fluid force to the force provided by a low force and rate spring.

5 Claims, 2 Drawing Figures

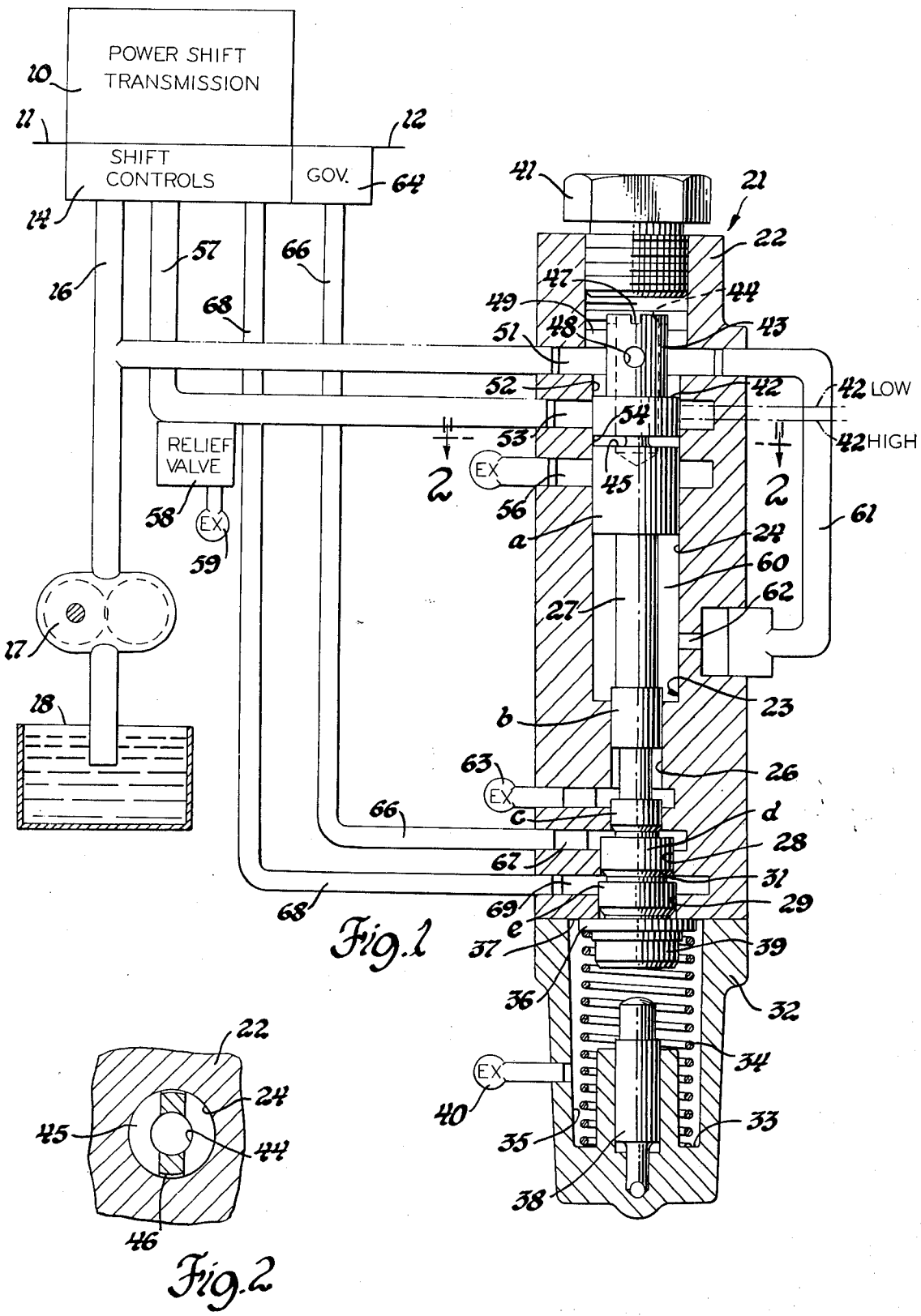

TRANSMISSION CONTROL WITH ESSENTIALLY RATELESS REGULATOR VALVE

BACKGROUND OF INVENTION

This invention relates to transmission controls and particularly an improved essentially constant pressure or rateless pressure regulator valve.

In power shift transmissions, a source of fluid pressure, such as an input driven pump, supplies a primary main line pressure flow regulated at high main line pressure by a regulator valve to manual or automatic shift controls. The first overage, the overage above main line requirements, is connected by the regulator valve to provide a secondary pressure supply, such as transmission lubrication supply. A second overage, the overage above main line and lubrication requirements is connected to exhaust. The regulator valve has a valve body with normally spaced ports for the main line, the lubrication line and the exhaust. These ports and the lands between these ports, first and second overage lands, have approximately equal standard axial lengths for uniformity for ease of manufacture, to meet uniform minimum leakage requirements and for guiding the valve element in all the valves in the valve body. The regulator valve has a valve element having a regulating land having a full circle end control edge at the end area on which the main line pressure acts and a second overage passage connected from the same end to a slot type second overage port in the land. The axial length of the valve element regulating land portion between the end edge of the land and the second overage port is merely slightly larger than the axial length of the lubrication port so the second overage port is blocked by the second overage land in the closed and low range overage flow regulating positions. The second overage port has an axial length about one third to one half of the axial length of the second overage valve body land between the lubrication and exhaust ports. Thus the valve element regulating land is axially short. The valve element has a first low main line overage regulating position in which the valve element dithers or oscillates with the end control edge closely spaced from the edge of the first overage land to control low first overage flow to the lubrication port to regulate main line pressure and the secondary overage port in the valve element is blocked by the body second overage land between the lubrication port and exhaust port. The second overage port is preferably centrally located on the second overage land primarily to insure that first overage flow supplies full lubrication requirements before second overage flow is open and for balanced leakage to the lubrication and exhaust ports. Thus the second overage port may extend or be located nearer the lubrication port but is spaced from the exhaust port to permit a sufficient range of regulating movement to fully supply the lubrication system before second overage is opened. The valve element in the high overage flow regulating position dithers in a regulating position with the intermediate second overage port in the valve element in a regulating position relative to the exhaust port in the body to regulate main line pressure. In the high overage flow regulating position the main pressure port in the body is connected externally of the valve element without regulation to the lubrication port and internally of the valve element with regulation between the second overage land and the valve element second overage port to the exhaust port. The full range of movement between regulating positions of the valve element from the low overage flow regulating position to the high overage flow regulating position is significantly less than, about one half to one third of the axial length of the second overage body land or about one fourth the normal range of movement without the intermediate port. This reduced range of regulator valve element movement particularly when used with a large diameter low force regulator valve and a low rate spring provides essentially rateless regulation of a main line pressure throughout the range of overage flow with first overage to a secondary supply, lubrication, and second overage to exhaust to provide a more constant or essentially rateless main line pressure regulation. The large diameter regulator land provides a high overage flow change relative to axial valve movement so a small axial movement provides sufficient overage flow change control. The main line pressure acting on the large land area of the valve element is partially counterbalanced so the pressure acts on a reduced net effective area to provide a low force relative to the large regulator land diameter. Since the fluid bias force is reduced the required spring force is reduced. The reduced or low force spring has a low spring rate as compared to a high force spring fitting the same normal size spring chamber. The large regulator land diameter provides a high rate of change of flow relative to axial valve movement which in combination with the porting providing a first overage control passage and then with greatly reduced movement provides a second overage control passage and a low rate spring provides substantially constant or essentially rateless pressure regulation to supply primary and secondary systems.

These and other features of the invention will be more apparent from the following detailed description and drawing of the invention.

FIG. 1 is a schematic view of a transmission and control system having an essentially rateless regulator valve.

FIG. 2 is a sectional view of FIG. 1 on the line 2—2.

DESCRIPTION OF PREFERRED EMBODIMENT

The invention is shown in a power shift transmission 10 having an input shaft 11 and an output shaft 12. The automatic or manual shift controls 14 selectively control the supply of main line pressure from main line 16 to a plurality of fluid operated drive ratio establishing devices in the transmission 10 to selectively establish a plurality of ratio drives. The pump 17 is driven by the input shaft and supplies a flow volume of fluid under pressure proportional to input shaft speed to main line 16 from the sump 18.

The pressure in main line 16 is regulated by the main line regulator valve 21 having a valve body 22 with a stepped bore 23 having a large regulating portion 24 at the closed pressure regulating end and a central small portion 26. The regulator valve element 27 has a large diameter land $a$ in the large regulatory bore portion 24 and small lands $b$ and $c$ in the small diameter bore portion 26. The bore 23 at the spring end of small bore 26 has in sequence in a valve opening direction an intermediate diameter control bore 28 and a large control bore 29 respectively slidably receiving the intermediate land $d$ and large land $e$ of control valve element 31. A spring abutment body portion 32 is suitably secured to the valve body 22 and has a seat 33 for low rate and low force spring 34 located in chamber 35. The spring also seats on the seat and stop flange 36 of control valve element 31 to bias the control valve element 31 and regulating valve element 27 as a unit in a closing direction to the closed position shown in which flange 36 engages the end wall 37 of the body 22 to limit further valve movement by the biasing spring. A stop pin 38 secured to abutment body portion 32 engages stop portion 39 of valve element 31 to limit downward opening movement of the valve elements 27 and 31 at a full open position beyond the range of regulating positions. The spring chamber 35 is vented by exhaust passage 40.

The screw threaded closure 41 seals the upper or pressure regulating end portion 24 of bore 23. The large diameter land $a$ of regulating valve element 27 has at its upper end an annular, full circumference, regulating end edge 42 and a smaller diameter stop portion 43 which engages closure 41 to limit upward closing movement of regulating valve element 27 at a fully closed position, preferably with a small overlap and beyond the range of regulation movement so stop flange 36 does not engage wall 37 during regulatory movement. The valve element 27 has a passage 44 extending axially through the stop portion 43 and into land $a$ to the intermediate narrow slot port 45 which as shown in FIG. 2 is provided by two oppositely disposed transverse slots intersecting axial passage 44 and provides a narrow port of reduced axial length having the flow capacity for maximum overage flow. The ends of the slots are connected at the land surface by a shallow recess 46 which with the slots provides a complete annular recess around the land so fluid pressure on the land at port 45 is balanced. The stop portion 43 has grooves 47 in the end and/or apertures 48 in the wall so main line pressure in chamber 49 in bore 24 between closure 41 and valve element land 27$a$ cannot be prevented from entering internal passage 44 and acting on the full end area of land 27$a$ by a fluid seal by the stop portion 43 during engagement with closure 41. This could only occur in the absence of any main line pressure, when gravity or vibration could move valve element 27 to engage closure 41 and subsequent application of main line pressure in chamber 60 to the larger differential area of land 27$a$, land 27$a$ less land 27$b$, and the pressure in chamber 49 on the smaller opposing area of land 27$a$ externally of stop portion 43 maintains the engagement of stop portion 43 with closure 41.

The bore portion 24 has in the body 22 in order in an opening direction, a main pressure port 51, a first overage land 52, a secondary pressure supply or lubrication port 53, a second overage land 54 and an exhaust port 56. The ports and lands have substantially the same standard or normal axial length for ease of manufacture, sealing and guiding. For those reasons port and land dimensions are substantially standardized throughout the valve body. The main port 51 is connected to main line 16. The lubrication port 53 is connected to the lubrication line or secondary supply line 57. Though the lubrication port is supplied with fluid at a pressure substantially up to main line pressure, due to the high lubrication flow and the line pressure drop, the relief valve 58 functions at a pressure lower than main line pressure to connect overage flow to exhaust 59 to prevent abnormally high pressures. The secondary supply line is shown as a lubrication line having a lubrication relief valve connected directly to the transmission lubrication system and may be a converter and lubrication supply line connected through the converter and then to the lubrication system and having a converter inlet pressure relief valve and/or a converter outlet and lubrication relief valve.

The main line 16 is always continuously connected by main line port 51 to chamber 49, main line branch 61, damping restriction 62 and to bore 24 at a point always between the lands 27$a$ and $b$ for continuous connection to both chambers 49 and 60. The main line pressure in chamber 49 acts in an opening direction on the full end area of land 27$a$ and in chamber 60 in a closing direction on the differential area of land 27$a$, the area of land 27$a$ less the area of land 27$b$, providing a low net regulated pressure bias force of the regulated pressure acting on the small area equivalent to the area of land 27$b$ and regulation at the large diameter ports and land 27$a$. An exhaust port 63 is always connected to bore 26 between the lands 27$b$ and $c$. The governor 64 driven by output shaft 12 supplies governor pressure proportional to output shaft speed to governor line 66 and governor port 67 at the step between bore 26 and larger bore 28 so governor pressure acts on the adjacent ends of lands 27$c$ and 31$d$ and acts on the differential area of land 31$d$, the area of land 31$d$ less the area of land 27$c$, to provide a force proportional to governor pressure and output speed reducing the bias force of spring 34 on regulator valve element 27. The shift controls 14 supply a signal pressure during forward drive operation in signal line 68 to signal port 69 at the step between bore portions 28 and 29 to act on the unbalanced area of land 31$e$ to reduce the spring bias force and regulated pressure during forward drive.

OPERATION

When the engine or the load drives the transmission input shaft 11 to drive the pump 17, a pump fluid pressure flow proportional to input shaft speed is provided in main line 16. The shift controls 14 have variable flow requirements to perform the shift control functions. The pump fluid flow less the shift control flow requirements provides a variable main line overage flow which is supplied to the regulator valve 21. The main line pressure through line 16 and port 51 enters chamber 49 and through passage 61 and restriction 62 enters the chamber 60 in the large bore 24 between the lands 27$a$ and 27$b$. The pressure in chamber 49 acts on the full area of land 27$a$ in an opening direction and in chamber 60 on the area of land 27$a$ reduced by the area of land 27$b$ in a closing direction so this differential pressure arrangement provides a net effective pressure bias force in an opening direction equivalent to the force provided by the pressure acting on the area of land 27$b$. Thus main line pressure on valve element 27 is balanced except for the main line pressure acting on an area equivalent to the area of land 27$b$ to provide a low force pressure bias in an opening direction on an area equivalent to the area of land 27$b$. This pressure bias force is low as compared to a pressure bias force acting on the full area of land 27$a$. The opposing normal size spring 34 is thus a low force spring to balance the low main line pressure bias force and has a low rate of force increase with movement. Since the size, length and diameter of valve springs in transmission valves is limited by the available space in the transmission housing, reducing the spring force requirements makes it possible to use a spring of the same size having more turns of smaller diameter wire providing a lower force stress and rate spring which provides more stable regulation and is less sensitive to temperature change without increasing the axial length of the spring. The restriction 62 damps main line pressure flow to the chamber 60 between the lands 27a and 27b where the pressure provides a valve closing force reducing the valve opening force on the end of land 27a by main line pressure in chamber 49 to damp regulatory oscillating movement for more constant regulation and also prevent engagement of stop flange 36 and end wall 37.

As soon as main line pressure increases to the minimum regulated pressure the valve element unit, consisting of the regulator valve element 27 and the control valve element 31, move as a unit to a low overage flow regulatory oscillating movement position in which the regulating edge 42 of land 27a is in the lubrication port 53 adjacent the first overage land 52 as indicated by dot-dash line 42 LOW. In the low overage flow regulating position regulatory oscillating movement of valve element 27 varies the small opening between its control edge 42 and the adjacent edge of first overage land 52 to regulate main line pressure at a minimum value and connects all overage to lubrication port 53 and line 57 to supply the flow requirements of the lubrication system. During such regulation pressure in lubrication port 53 will be lower than main line pressure. During this low overage regulation, the secondary overage flow path through the central passage 44 which connects main line pressure through valve element land 27a to port 46, is blocked by the second overage land 54 of the valve body. The port 46 is preferably one third the axial length of second overage land 54 and centrally located with respect to the second overage land 54 so in a low or near low overage flow regulating position the second overage flow path remains blocked and leakage to lubrication port 53 and exhaust port 56 is equalized. The width of the valve element port 46 may be increased in width or moved some toward the lubrication port edge of second overage land 54 as increased leakage or a momentary small connection during oscillation to the lubrication port 53 would not prevent operation. The port 46 cannot be significantly lowered relative to second overage land 54 as it is important that with increased overage flow in a low range of overage flow that the regulator valve first regulate and open sufficiently to supply overage to the lubrication port 53 to substantially fully supply lubrication requirements and then secondly regulate overage to the exhaust port 56. Thus the axial length of the second overage land 54 below the second overage port 45, an overlap distance, should be sufficient to keep the second overage port 45 closed during valve movement in the first overage regulating range until the secondary lubrication supply requirements are substantially met.

As the main line overage flow increases the valve, member 27 moves in an opening direction to a more open regulating position increasing overage flow to lubrication port 53 and line 57 and will substantially supply lubrication system flow requirements to lubrication port 53 substantially at main line pressure before the valve element port 46 is open for regulating second overage flow to exhaust port 56. When the high main line overage flow reduced by overage flow to the lubrication system still provides secondary overage flow the regulator valve element moves to a secondary overage regulating position in which land edge 42 is in a position indicated by dot-dash line 42 HIGH and no longer significantly regulates first overage to lubrication port 53 and regulates second overage flow between the lower edge of valve element port 46 and the upper edge of exhaust port 56 to exhaust 56.

The range of regulator valve element movement between the low flow regulating position 42 LOW and the high flow regulating position 42 HIGH is substantially equal to the small overlap between the secondary overage port 46 in the valve element and the exhaust port 56 in the closed position of the valve element 27. This overlap is preferably one third to one half the axial length of the second overage land. Particularly this small range or distance of axial movement throughout the complete low to high flow regulating range and also the low net regulated pressure force on the valve element, the low force spring having a very low rate of change of force relative to movement and the large diameter regulating ports providing a large change of flow capacity in response to a small axial movement provide an essentially rateless regulator valve regulating a high main line pressure at an essentially constant value while providing first overage to a secondary lubrication system and second overage to exhaust. This valve provides this rateless regulation in an axially short valve construction having only a main line port, a first overage secondary supply port and a second overage exhaust port having normal sequential spacing and a single axially short regulating control land. The regulating valve element, the regulating land and the differential area land have sufficient length to maintain valve element alignment in the bore.

The governor pressure in governor line 66 and port 67 and the forward signal pressure in signal line 68 and port 69 both act on control valve element 31 to reduce the regulated pressure without changing the above described regulating operation providing an essentially constant rateless regulated pressure.

The exhaust ports drain to the sump. The words upper and lower, etc., used with reference to the position and direction of movement of valve parts have been used for convenient reference to the drawing, but it should be appreciated that the regulator valve may be used in any position. It will be appreciated that the invention may be used in the above described preferred embodiment and modifications thereof.

It is claimed:

1. In a regulator valve: primary fluid supply means having variable overage: secondary fluid supply means having limited flow requirements: regulator valve means having a body having a bore having in an opening direction order, a first overage land, a secondary supply port connected to said secondary supply means, a second overage land and an exhaust port; valve element means having a regulating land in said bore having a control edge, a second overage passage to said second overage port having full overage flow capacity and less axial length than said second overage land and the axial distance between said control edge and the remote edge of said second overage port being substantially equal to the axial length of the secondary supply port plus the second overage land reduced by the axial movement of the regulating land in the range of first overage regulating positions; chamber means between a portion of said bore and a portion of said valve element means connected to said primary fluid supply means to supply fluid to said control edge for regulated flow to said secondary supply port, to supply fluid to said second overage passage in said regulating land and to effectively act on an area of said valve element means; a spring acting on said valve element means providing an opposite valve closing bias force; said valve element means regulating main line pressure during low overage flow in a low overage flow regulating oscillating position with the control edge spaced from the first overage land and regulating first overage flow to said secondary supply port and said second overage port being blocked by said second overage land and with increasing overage flow said valve element means moving in an opening direction through a range of first overage regulating positions regulating increasing first overage flow and when the secondary supply means flow requirements are substantially met connecting overage to said secondary supply port substantially without regulation and regulating second overage flow from said second overage port at said second overage land and connecting overage to said exhaust port in a range of second overage regulating positions up to high overage flow at a high overage regulating position providing a full range of regulatory positions from low to high flow having movement less than the axial length of the second overage land providing essentially rateless primary supply pressure regulation and a secondary fluid supply from low to high overage flow.

2. In a regulator valve: primary fluid supply means having variable overage: secondary fluid supply means having limited flow requirements: regulator valve means having a body having a bore in an opening direction order, a first overage land, a secondary supply port connected to said secondary supply means, a second overage land and an exhaust port; valve element means having a regulating land in said bore having a control edge, a second overage port and a second overage passage to said second overage port having full overage flow capacity and less axial length than said second overage land and the axial distance between said control edge and the remote edge of said second overage port being substantially equal to the axial length of the secondary supply port plus the second overage land reduced by the axial movement of the regulating land in the range of first overage regulating positions; chamber means between a portion of said bore and a portion of said valve element means connected to said primary fluid supply means to supply fluid to said control edge for regulated flow to said secondary supply port, to supply fluid to said second overage passage in said regulating land and to effectively act on an area of said valve element means smaller than the area of said regulating land to provide a small valve opening bias force; a long spring acting on said valve element means providing an opposite valve closing bias force having a low rate of change of force with movement of said valve element means; said valve element means regulating main line pressure during low overage flow in a low overage flow regulating oscillating position with the control edge spaced from the first overage land and regulating first overage flow to said secondary supply port and said second overage port being blocked by said second overage land and with increasing overage flow said valve element means moving in an opening direction through a range of first overage regulating positions regulating increasing first overage flow and when the secondary supply means flow requirements are substantially met connecting overage to said secondary supply port substantially without regulation and regulating second overage flow from said second overage port at said second overage land and connecting overage to said exhaust port in a range of second overage regulating positions up to high overage flow at a high overage regulating position providing a full range of regulatory positions from low to high flow having movement less than the axial length of the second overage land providing essentially rateless primary supply pressure regulation and a secondary fluid supply from low to high overage flow.

3. In a regulator valve: primary fluid supply means having variable overage: secondary fluid supply means: regulator valve means having a body having a bore with a closed end; valve element means having a regulating land in said bore having a control end adjacent said closed end forming a chamber in said bore between the control end and the closed end of said bore connected to said primary supply means to provide a valve opening bias force; a spring acting on said valve element means providing an opposite valve closing bias force; said valve bore having, in an opening direction order, a first overage land, a secondary supply port connected to said secondary supply means, a second overage land and said secondary supply port and second overage land having standard axial lengths; said regulating land having a second overage passage extending from said chamber axially to a second overage port having a smaller axial length than said second overage land and spaced from said control end an axial distance greater than the axial length of said secondary supply port and less than the axial length of the secondary supply port plus the second overage land; said valve element means regulating main line pressure during low overage flow in a low overage flow regulatory oscillating position with the control end spaced from the first overage land and controlling overage flow to said secondary supply port and said second overage port being blocked by said second overage land and with overage flow increasing to high overage flow moving to a high overage flow regulating oscillating position after the main line and secondary supply requirements are met connecting overage to said secondary supply port substantially without control and controlling overage flow from said second overage port at said second overage land and connecting overage to said exhaust port providing an axial range of regulatory positions less than the length of the second overage land providing essentially rateless main line pressure regulation and a secondary fluid supply from low to high overage flow.

4. The invention defined in claim 3 and said second overage port having an axial length not substantially more than one half the axial length of said second overage land.

5. In a regulator valve: primary fluid supply means having variable overage: secondary fluid supply means: regulator valve means having a body having a stepped bore with a large diameter portion and a small diameter portion; a closure closing the end of the large diameter portion remote from the small diameter portion; a restriction; valve element means having a large land in the large diameter bore portion having a control end adjacent said closure and a small land in the small diameter bore portion forming a first chamber in the large diameter bore portion between the control end of the large land and the closure connected to said primary fluid supply means and a second chamber in the stepped bore portion between the large and small lands connected through said restriction to said primary fluid supply means providing pressure acting on a small net area equal to said small land area to provide a small value opening bias force; a long spring acting on said valve element means providing an opposite valve closing bias force having a low rate of change of force with movement of said valve element means; said large valve bore having in an opening direction order, a first overage land, a secondary supply port connected to said secondary fluid supply means, a second overage land and an exhaust port having standard substantially equal axial lengths; stop means limiting closing movement of said valve element means to provide a closed position with said control end of said large land having a small overlap with said first overage land closing said first chamber; said large land having a second overage passage extending from said first chamber axially to a second overage port having about one-third the axial length of said second overage land and axially centrally located and blocked by said overage land when the valve element is in said closed position; said valve element means regulating primary fluid supply means pressure during low overage flow in a low overage flow regulatory oscillating position with the control end spaced from the first overage land and controlling overage flow to said secondary supply port and said second overage port being blocked by said second overage land and with overage flow increasing to high overage flow moving to a high overage flow regulating oscillating position after the primary and secondary supply means requirements are met connecting overage to said secondary supply port substantially without control and controlling overage flow from said second overage port at said second overage land and connecting overage to said exhaust port providing an axial range of regulatory positions one-third the length of the second overage land providing essentially rateless pressure regulation and a secondary fluid supply from low to high overage flow.

* * * * *

UNITED STATES PATENT AND TRADEMARK OFFICE
CERTIFICATE OF CORRECTION

PATENT NO. : 3,916,934
DATED : November 4, 1975
INVENTOR(S) : Richard J. Koenig

It is certified that error appears in the above—identified patent and that said Letters Patent are hereby corrected as shown below:

Column 9, line 19, before "overage" insert -- second --.

Signed and Sealed this

Thirteenth Day of July 1976

[SEAL]

Attest:

RUTH C. MASON
*Attesting Officer*

C. MARSHALL DANN
*Commissioner of Patents and Trademarks*